United States Patent
Mohammed et al.

(10) Patent No.: US 12,425,390 B2
(45) Date of Patent: Sep. 23, 2025

(54) REAL-TIME OWNERSHIP STATUS CHECK FOR NETWORK DEVICES IN A NETWORK

(71) Applicant: Cisco Technology, Inc., San Jose, CA (US)

(72) Inventors: Jabir Hamediya Mohammed, Karnataka (IN); Bazil Mohammed Ali, Kerala (IN); Reda Haddad, San Jose, CA (US); Chennakesava Reddy Gaddam, Karnataka (IN); Nishad C M, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 18/127,372

(22) Filed: Mar. 28, 2023

(65) Prior Publication Data
US 2024/0333706 A1    Oct. 3, 2024

(51) Int. Cl.
*H04L 9/40* (2022.01)

(52) U.S. Cl.
CPC ........ *H04L 63/0823* (2013.01); *H04L 63/102* (2013.01)

(58) Field of Classification Search
CPC ... H04L 63/0823; H04L 63/102; H04L 9/006; H04L 9/3263; G06F 21/33; H04W 12/069
See application file for complete search history.

(56) References Cited

U.S. PATENT DOCUMENTS

| | | | |
|---|---|---|---|
| 2002/0128979 A1* | 9/2002 | Hu | G06Q 20/3674 705/67 |
| 2007/0214356 A1 | 9/2007 | Song et al. | |
| 2008/0263353 A1 | 10/2008 | Droms et al. | |
| 2012/0158841 A1* | 6/2012 | Liu | H04L 67/535 709/204 |
| 2014/0122823 A1* | 5/2014 | Gupta | G06F 3/0607 711/170 |
| 2018/0300776 A1* | 10/2018 | Yost | G06Q 30/0283 |
| 2020/0327231 A1 | 10/2020 | Smith | |
| 2021/0306157 A1 | 9/2021 | Wattiau et al. | |
| 2024/0143504 A1* | 5/2024 | Fishel | G06F 12/084 |

OTHER PUBLICATIONS

K. Watsen et al. ("Watsen," RFC: 83: 8366, pp. 1-23, May 2018) (Year: 2018).*
Kai Fish et al. ("Kai," "Secure Identities and initial credential bootstrapping for IoT@Work", pp. 781-786, 2012) (Year: 2012).*

(Continued)

*Primary Examiner* — Luu T Pham
*Assistant Examiner* — Canh Le
(74) *Attorney, Agent, or Firm* — Lee & Hayes, P.C.

(57) ABSTRACT

Techniques and architecture are described for verifying real-time ownership of network devices, e.g., routers, switches, etc. The real-time ownership of network devices is verified using the ownership voucher/ownership certificate model, which is useful for device security and protocol security. The techniques and architecture are leveraged on various bases such as, for example, routing, attestation, protocols, management protocols, etc., where a user may enforce the ownership check before making any connection of a network device or even managing the respective network device after it is securely booted.

20 Claims, 5 Drawing Sheets

(56) References Cited

OTHER PUBLICATIONS

Lifei Tang et al., "A Permissioned Blockchain Based Feature Management System for Assembly Devices," 2020, pp. 183378-183390. (Year: 2020).*

Gustavo Santana Torrellas et al., "An Authentication Protocol for Agent Platform Security Manager," 2003, pp. 623-628. (Year: 2003).*

Pritikin, M., et al., "Bootstrapping Remote Secure Key Infrastructures (BRSKI)," 2021 IETF Trust, published May 21, 2021, 114 pages.

* cited by examiner

```
┌─────────────────────────────────────────────────────────────────┐
│ RECEIVE, BY AN OWNERSHIP VERIFICATION ENTITY FROM A FIRST       │
│ NETWORK DEVICE, IDENTIFICATION ARTIFACTS RELATED TO THE FIRST   │
│ NETWORK DEVICE                                                  │
│                              402                                │
└─────────────────────────────────────────────────────────────────┘
                                 │
                                 ▼
┌─────────────────────────────────────────────────────────────────┐
│ BASED AT LEAST IN PART ON THE IDENTIFICATION ARTIFACTS,         │
│ DETERMINE A REAL-TIME OWNERSHIP OF THE FIRST NETWORK DEVICE     │
│                              404                                │
└─────────────────────────────────────────────────────────────────┘
                                 │
                                 ▼
┌─────────────────────────────────────────────────────────────────┐
│ FORWARD, BY THE OWNERSHIP ENTITY, THE REAL-TIME OWNERSHIP       │
│ STATUS TO AT LEAST ONE OF (i) AN ADMINISTRATOR OF A NETWORK     │
│ THAT INCLUDES THE FIRST NETWORK DEVICE OR (ii) A SECOND         │
│ NETWORK DEVICE                                                  │
│                              406                                │
└─────────────────────────────────────────────────────────────────┘
```

REAL-TIME OWNERSHIP STATUS CHECK FOR NETWORK DEVICES IN A NETWORK

TECHNICAL FIELD

The present disclosure relates generally to providing ownership status of network devices of a network and more particularly, to providing real-time ownership status of network devices of a network using a manufacturer authorized signing authority (MASA) service and ownership artifacts such as an ownership voucher, an ownership certificate, a pinned-domain certificate, and/or a serial number.

BACKGROUND

In networks, numerous network devices, e.g., routers, switches, etc., are utilized. Attestation solves the unique problem of trustworthiness of a particular network device. The attestation gives insight on the security posture of the network device, which includes IMA event logs, hardware integrity visibility, etc. Generally, all network devices manufactured by a particular manufacturer and running the manufacturer's genuine image generally fit into the category of a trustworthy network device. However, there is still a problem with respect to real-time ownership claims of network devices. By resolving real-time ownership claims, it can almost be guaranteed that the network device is indeed manufactured and sold via a correct commercial channel and that a particular user has claimed the ownership of the network device. Additionally, it can almost be guaranteed that the user has complete control over the network device via the ownership voucher/ownership certificate model. It can also be guaranteed almost that the user maintains the state of the ownership voucher and thus maintains freshness of the ownership voucher.

As is known, device security and protocol security are deeply connected to hardware root of trust and at least slightly associated with how the user securely boots a qualified image. Thus, secure zero touch provisioning (sZTP) helps achieve a secure booting of the network device and even claiming ownership of the device with the assistance of the MASA. In particular, with various advancements in technology, more users are moving to sZTP based workflow. The ownership voucher/ownership certificate model plays a crucial role in secure booting of the network device with the right config and right set of images. With this process, the user may take complete ownership of the network device using the pinned-domain certificate carried in an ownership certificate that is signed with an ownership voucher. and the user may later complete the ownership transfer using the ownership certificate itself. Ownership vouchers may be issued after checking the attestation information (security posture) of the respective network device by the MASA. If a user loads genuine software and runs genuine binaries and libraries and keyset, then the cross-verification of the attestation information with the known good values may guarantee the trustworthiness of the network device, but this does not mean that a respective user has claimed ownership of the network device or that the user is managing the network device. Being able to verify the real-time ownership status of a network device is a large improvement in security, which would help in indicating the real purchaser of the network device as well as defining the real owner of the network device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure describes techniques and architecture for verifying ownership of network devices, e.g., routers, switches, etc. In particular, the techniques and architecture described herein leverage the ownership voucher/ownership certificate model useful for device security and protocol security that is deeply rooted to the hardware root of trust. The techniques and architecture are leveraged on various bases such as, for example, routing, attestation, protocols, management protocols, etc., where a user may enforce the ownership check before making any connection of a network device or even managing the respective network device after it is securely booted via sZTP.

As an example, a method may include receiving, by an ownership verification entity from a first network device, identification artifacts related to the first network device. Based at least in part on the identification artifacts, a real-time ownership status may be determined with respect to the first network device. Additionally, the ownership verification entity may forward the real-time ownership status to at least one of (i) an administrator of a network that includes the first network device or (ii) a second network device.

EXAMPLE EMBODIMENTS

In accordance with configurations described herein, as previously noted, ownership of network devices, e.g., routers, switches, etc., is verified using the ownership voucher/ownership certificate model, which is useful for device security and protocol security. The techniques and architecture are leveraged on various bases such as, for example, routing, attestation, protocols, management protocols, etc., where a user may enforce the ownership check before making any connection of a network device or even managing the respective network device after it is securely booted via sZTP.

As is known, an ownership voucher is anchored on a network device through, or associated with, a unique device identifier and trust anchor certificates, e.g., a secure unique device identifier (SUDI) certificate or a LdevID certificate, which are anchored on the network device as read only, e.g., the certificate cannot be modified. For example, the unique device identifier information is burned onto the network device during manufacture of the network device. An ownership certificate for the network device is anchored on the ownership voucher. A manufacturer authorized signing authority (MASA) database associated with the manufacturer of the network device stores all unique identifiers for the network devices it manufactures.

Future looking users may require a straightforward way to identify the real owner of a network device. There is a growing need to verify the ownership of the network devices by the users. In particular, there is a need for users to check the ownership status of a network device before establishing any connectivity or while doing a trusted path routing procedure. In this manner, one can solve the question of "Do I really own this network device" or "Does someone else whom I trust own this particular network device."

While there may not be a need for sZTP for verifying ownership of a network device in configurations described herein, sZTP is one example to get the network device to consume the ownership voucher/ownership certificate from a sZTP server. Another example may include copying the ownership voucher/ownership certificate on the network device manually or programmatically and installing them on the network device. In both examples, an important aspect for verifying ownership of a network device in accordance with configurations described herein is the installation of the ownership voucher/ownership certificate on the network device with the SUDI and/or the unique serial number of the network device.

When the real security of a network device is considered, the security is rooted on secure booting of that network device with the right set of signed software from the original equipment manufacturer (OEM), as well as the correct set of configurations for the device. sZTP helps in achieving both. The MASA plays a critical role by providing an ownership voucher for the specific network device after checking the ownership claim. Claiming the ownership of the network device is necessary before a network device can accept a trust config as well as before a device an even trust a bootstrapping server by which a secure image can be loaded. With the extended ownership voucher, one can even carry the qualified image hashes in an ownership voucher to carry results that give insight on the security posture of the network device.

A user can take ownership via a MASA workflow of the respective OEM. The OEM can produce an ownership voucher after verifying the authenticity of the user, e.g., customer. In particular, a MASA server may create the ownership voucher at the time of manufacture of network devices. The MASA server may store the ownership vouchers (as well as any other unique identifiers for the network devices it manufactures) in an ownership voucher database and/or an OEM database.

Generally, it is not desirable to blindly trust the ownership claim until checking with the OEM MASA service. Attestation only hopes to access the real-time security posture of the network device. Attestation does not indicate that a specific user owns the network device, or a trusted user owns the network device. Thus, using the ownership voucher/ownership certificate model in conjunction with the OEM MASA service helps in certifying "Do I really own this network device" or "Does someone else whom I trust own this particular network device." Accordingly, until, or unless, one can verify the ownership of a peer network device, one cannot make use of critical infrastructure, whether it is for routing, management, or other protocol services. This requires real-time validation of ownership status with an OEM MASA service. Examples of information, e.g., information artifacts, that is required for real-time ownership verification is listed below.

Scenario 1 (Communicating the ownership voucher itself from the network device to a peer device and/or an admin and/or an owner of the network device):
Scenario 1:
yang-data signed-artifact-1:
　Signed-Artifact
　OEM-public-certificate Binary
　Ownership-Voucher Binary
　Nonce Binary
　Sudi-Signature PKCS7

Thus, for Scenario 1, the information artifacts may include OEM public certificate, which signs the ownership voucher, the ownership voucher itself, and a nonce. All the information artifacts may be signed using the SUID/LdevId along with its certificate chain.

Scenario 2 (Communicating the PDC information from the network device to the peer network device):
Scenario 2:
yang-data signed-artifact-2:
　Signed-Artifact
　OEM-public-certificate Binary
　Pinned-domain-certificate Binary
　Ownership-certificate Binary
　Nonce Binary
　Sudi-Signature PKCS7

Thus, for Scenario 2, the information artifacts may include the OEM public certificate, which signs the ownership voucher, the pinned-domain certificate which is carried in the ownership voucher, the ownership certificate on the network device, the serial number of the network device, and a nonce. The signature may be in PKCS7 format, which contains the signature along with the chained SUDI certificate. Each network device after receiving the signed information from the peer network device may verify the information using the SUDI leaf and verify the cert chain using the SUDI certificate authority (CA) or LdevID CA cert. The network device may cross check the serial number inside the ownership voucher or explicitly carried in the signed information against the SUDI or LdevID subject name that holds the SN and product ID (PID) of the peer network device.

Once the previously described information artifacts, e.g., one or more of the OEM public certificate, the ownership voucher, the nonce, the pinned-domain certificate, the ownership certificate on a network device, the serial number of a network device, etc., has been received, a network device, during any connection establishment with a peer network device, may reach out to the MASA server to check the real-time ownership status of the peer network device to which the network device wishes to connect. Minimal information for checking the real-time ownership status may include, for example, the serial number of the peer network device and the pinned-domain certificate of the peer network device. The MASA may in turn check the issuance based on the serial number of the peer network device and the pinned-domain certificate of the peer network device and share the real-time status of the claimed ownership. The real-time status of the claimed ownership may be shared with the network device and/or an admin of the network.

Additionally, once the previously described information artifacts, e.g., one or more of the OEM public certificate, the ownership voucher, the nonce, the pinned-domain certificate, the ownership certificate on a network device, the serial number of a network device, etc., has been received, an admin of a network and/or an owner of a network device may reach out to the MASA server to check the real-time ownership status of the peer network device to which the network device wishes to connect. Minimal information for checking the real-time ownership status may include, for example, the serial number of the peer network device and the pinned-domain certificate of the peer network device. The MASA may in turn check the issuance based on the serial number of the peer network device and the pinned-domain certificate of the peer network device and share the real-time status of the claimed ownership. The real-time status of the claimed ownership may be shared with the admin of the network and/or the owner of the network device.

The OEM public certificate may help in identifying the OEM MASA to be reached for the ownership check. Additionally, the ownership check may be through a MASA cloud service that communicates with the appropriate MASA server. The pinned-domain certificate and the ownership certificate may help in identifying the true owner of the device. Additionally, the SUDI or the LdevID based signature with a nonce may help each peer protect against replay attacks and freshness of the information provided to be cross verified with the MASA server.

In configurations, the real-time ownership status check may be performed on both network devices, e.g., an admin may wish to determine the real-time ownership of both the initial network device and the peer network device with which the initial network device wishes to connect. Additionally, the initial network device may initiate the ownership check while the peer network device may also wish to perform a real-time ownership status check prior to connecting with the initial network device.

In configurations, a trusted verifier server, e.g., a proxy server, may be utilized to handle the real-time ownership status check. In such a configuration, the trusted verifier server, e.g., trusted verifier node, may be co-located in the network. The trusted verifier server may reach out to the MASA service, e.g., the MASA service in the cloud, to check the ownership status based on the previously described information artifacts. In this configuration, the trusted verifier node may send the information artifacts to the verifier server node. The trusted verifier server node may contact the appropriate OEM's MASA service and after the OEM's MASA service has performed the real-time ownership verification, the trusted verifier node may create a time stamped ownership information certificate that indicates the real-time status of the ownership claim for the corresponding network nodes, as well as information that includes original equipment public certificates, pinned-domain certificates and the serial number of the network devices. The stamped ownership information may be signed using the trusted verifier server certificate. This signed, stamped ownership information certificate may then be communicated to the initial network device and the peer network device for real-time validation of the claimed ownership before allowing any connection. In configurations, the time stamped ownership information certificate may be stored by the trusted verifier server. The time stamped ownership information certificate may be valid for a pre-determined amount of time and thus, each time a connection is desired between two network devices (or when a network device boots), the trusted verifier server may utilize corresponding time stamped ownership information certificates for the corresponding network devices, if still valid, for verifying the real-time ownership of the network devices. Accordingly, the MASA service/server does not need to be contacted every time a real-time ownership check is desired.

Accordingly, in configurations, a method includes receiving, by an ownership verification entity from a first network device, identification artifacts related to the first network device. Based at least in part on the identification artifacts, a real-time ownership status is determined with respect to the first network device. Additionally, the ownership verification entity forwards the real-time ownership status to at least one of (i) an administrator of a network that includes the first network device or (ii) a second network device.

In configurations, the method further includes that the ownership verification entity is a manufacturer authorized signing authority (MASA). In configurations, the identification artifacts comprise an ownership voucher, an original equipment manufacturer (OEM) post certificate, an ownership voucher signed by the OEM public certificate, and a nonce. In configurations, the identification artifacts are signed by a unique device identifier. In configurations, the real-time ownership status of the first network device is determined, based on the OEM public certificate and the ownership voucher, verifying, by the manufacturer authorized signing authority, an ownership voucher and issuance by the manufacturer signing authority for the first network device.

In configurations, the method further includes based at least in part on the OEM public certificate, determining an identity of the manufacturer authorized signing authority.

In configurations, the ownership verification entity is a manufacturer authorized signing authority and the identification artifacts comprise an ownership voucher, an original equipment manufacturer (OEM) post certificate, an ownership voucher signed by the OEM public certificate, and a nonce. In configurations, the identification artifacts are signed by a unique device identifier. In configurations, the real-time ownership status of the first network device is determined, based on the serial number and the pinned-domain certificate, verifying, by the manufacturer authorized signing authority, an ownership voucher issuance by the manufacturer authorized signing authority for the first network device.

In configurations, the ownership verification entity may comprise a verifier server and the identification artifacts may comprise an ownership voucher, an original equipment manufacturer (OEM) post certificate, an ownership voucher signed by the OEM public certificate, and a nonce. In configurations, the identification artifacts are signed by a unique device identifier. In configurations, determining the real-time ownership status of the first network device may comprise forwarding, by the verifier server to a manufacturer authorized signing authority, the ownership voucher. The determining may also include, based on the ownership voucher, verifying, by the signing authority, an ownership voucher issuance by the manufacturer authorized signing authority for the first network device.

In configurations, the method further comprises based at least in part on the ownership voucher issuance verified by the manufacturer authorized signing authority, receiving, by the verifier server, the real-time ownership status of the first network device. In configurations, the method further comprises creating a signed stamped ownership information certificate comprising one or more of ownership status, the OEM certificate, the nonce, a time stamp, a pinned-domain certificate, a serial number, or the ownership voucher. The signed stamped ownership information certificate may be signed with a signature of the verifier server. The method may also include forwarding the signed stamped ownership information certificate to the first network device and the second network device. The method may further comprise based on the signed stamped ownership information certificate, verifying, by the second network device, real-time ownership of the first network device.

In configurations, a system may comprise one or more processors and one or more non-transitory computer-readable media storing computer-executable instructions that when executed by the one or more processors, cause the one or more processors to perform actions comprising any of the previously described methods Advantages of checking ownership in real-time with an OEM MASA include, but are not limited to, real-time authenticity of the ownership voucher may be guaranteed. Additionally, the ownership voucher can be revoked via an admin in the network using the OEM MASA, so freshness can be guaranteed in the case of an infinite valid ownership voucher being issued. Furthermore, a real-time check with the OEM database may be performed to check the ownership claim and the sale information. Also, ownership status may be checked with the OEM MASA.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
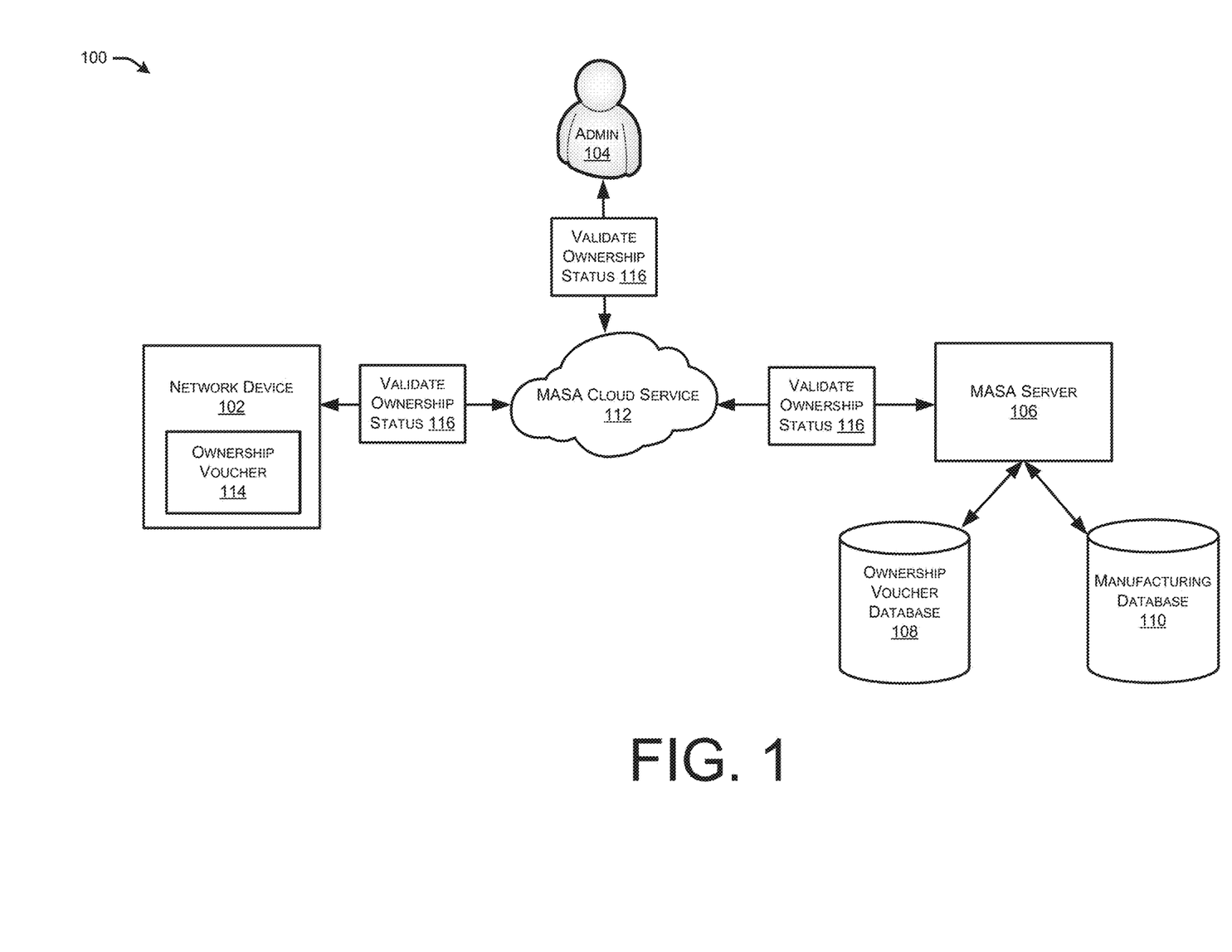
FIG. 1 schematically illustrates an example of a portion of a network in which real-time ownership of network devices may be determined, in accordance with techniques and architecture described herein.

FIG. 1 schematically illustrates an example arrangement 100 that includes a network device 102 and an admin 104, e.g., owner, of the network device 102. An OEM MASA server 106 that is in communication with an ownership voucher database 108 and a manufacturing database 110 (OEM database) is also included. In configurations, the admin 104 and the network device 102 may communicate with the OEM MASA server 106 via a MASA cloud service 112. In some configurations, the admin 104 and the network device 102 may communicate with the OEM MASA server 106 via a different means.

As is known, an ownership voucher 114 is anchored on the network device 102 through, or associated with, a unique device identifier and trust anchor certificates, e.g., a secure unique device identifier (SUDI) certificate or a LdevID certificate, which are anchored on the network device 102 as read only, e.g., the certificate cannot be modified. For example, the unique device identifier information is burned onto the network device 102 during manufacture of the network device 102. An owner certificate (not shown) for the network device 102 is anchored on the ownership voucher 114. The MASA's ownership voucher database 108 and/or manufacturing database 110 associated with the manufacturer of the network device 102 stores all unique identifiers for the network devices the manufacturer manufactures. In configurations, some of the unique identifiers for the network devices the manufacturer manufactures may be stored in the ownership voucher database 108 and other unique identifiers for the network devices the manufacturer manufactures may be stored in the manufacturing database 110. The admin 104 can take ownership via a MASA workflow of the respective OEM. The OEM can produce the ownership voucher 114 after verifying the authenticity of the admin 104. In particular, the MASA server 106 may create the ownership voucher 114 at the time of manufacture of the network device 102.

Once the previously described information artifacts, e.g., one or more of the OEM public certificate, the ownership voucher, the nonce, the pinned-domain certificate, the ownership certificate on a network device, the serial number of a network device, etc., has been received, the admin 104 may reach out to the MASA server 106 to verify or validate the real-time ownership status 116 of the network device 102. Minimal information for checking the real-time ownership status 116 may include, for example, the serial number of the network device 102 and the pinned-domain certificate of the network device 102. The MASA server 106 may in turn check the issuance based on the serial number of the network device 102 and the pinned-domain certificate of the network device 102 based on information stored in the ownership database 108 and/or the manufacturing database 110. The MASA server 106 may share the real-time ownership status 116 of the claimed ownership of the network device 102 with the admin 104. The real-time ownership of the network device 102 may be to determine "Do I really own this network device" or "Does someone else whom I trust own this particular network device," e.g., during or prior to a connection establishment with the network device 102. As previously noted, minimal information for checking the real-time ownership status 116 of the network device 102 is as follows:

Yang Model:
yang-data ownership-status-check:
   Ownership-status-check
   Serial-Number Binary
   Pinned-domain-cert Binary The OEM public certificate may help in identifying the OEM MASA server 106 to be reached for the ownership check, e.g., the OEM public certificate may identify the manufacturer of the network device 102. Additionally, the ownership check may be through the MASA cloud service 112 that communicates with the appropriate MASA server 106. The pinned-domain certificate and the ownership certificate may help in identifying the true owner of the network device 102. Additionally, the SUDI or the LdevID based signature with the nonce may help the network device 102 protect against replay attacks and freshness of the information provided to be cross verified with the MASA server 106. In configurations, the real-time ownership check of the network device 102 may be based on different information artifacts. For example, the real-time ownership status 116 of the network device 102 may be based on the OEM public certificate and/or the ownership voucher 114.

Figure 2:
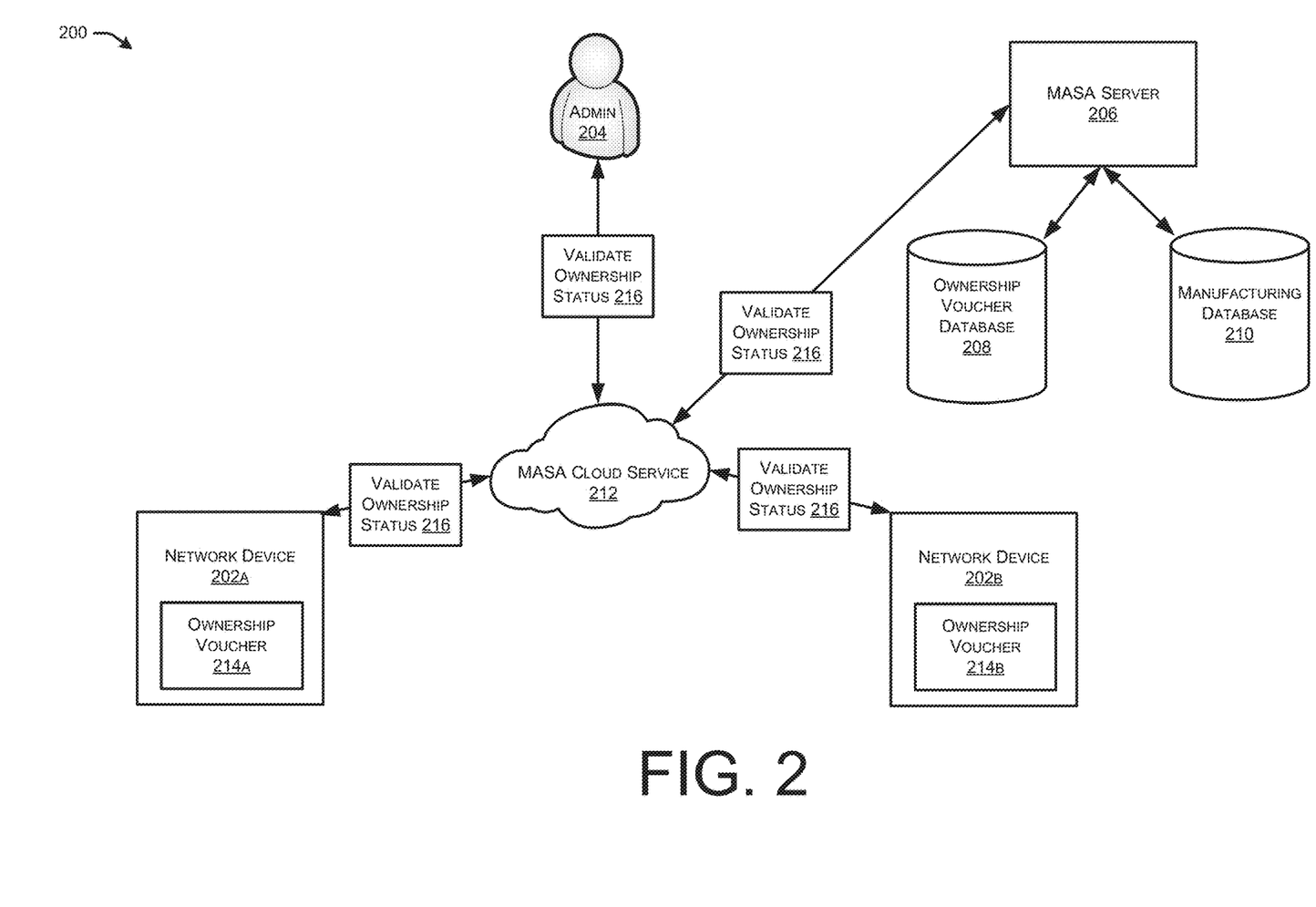
FIG. 2 schematically illustrates another example of a portion of a network in which real-time ownership of network devices may be determined, in accordance with the techniques and architecture described herein.

FIG. 2 schematically illustrates another example arrangement 200 that includes two network device 202a and 202b and an admin 204, e.g., owner, of one or both network devices 202a, 202b. An OEM MASA server 206 that is in communication with an ownership voucher database 208 and a manufacturing database 210 (OEM database) is also included. In configurations, the admin 204 and the network devices 202a, 202b may communicate with the OEM MASA server 206 via a MASA cloud service 212. In some configurations, the admin 204 and the network devices 202a, 202b may communicate with the OEM MASA server 206 via a different means.

As is known, an ownership voucher 214a, 214b is anchored on the network devices 202a, 202b, respectively, through, or associated with, a unique device identifier and trust anchor certificates, e.g., a secure unique device identifier (SUDI) certificate or a LdevID certificate, which are anchored on the network devices 202a. 202b as read only, e.g., the certificate cannot be modified. For example, the unique device identifier information is burned onto the network devices 202a, 202b during manufacture of the network devices 202a, 202b. An owner certificate (not shown) for each network device 202a, 202b is anchored on the ownership voucher 214a. 214b, respectively. The MASA's ownership voucher databases 208 and/or manufacturing database 210 associated with the manufacturer of the network device 202a, 202b stores all unique identifiers for the network devices the manufacturer manufactures. In configurations, some of the unique identifiers for the network devices the manufacturer manufactures may be stored in the ownership voucher database 208 and other unique identifiers for the network devices the manufacturer manufactures may be stored in the manufacturing database 210. The admin 204 can take ownership via a MASA workflow of the respective OEM. The OEM can produce the ownership vouchers 214a, 214b after verifying the authenticity of the admin 204. In particular, the MASA server 206 may create the ownership vouchers 214a. 214b at the time of manufacture of the network devices 202a, 202b.

In configurations, the real-time ownership status check may be performed on one (as previously described) or both network devices 202a, 202b, e.g., the admin 204 may wish to verify or validate the real-time ownership of both the network device 202a and the network device 202b with which the network device 202a wishes to connect. Additionally, the network device 202a may initiate the real-time ownership check while the network device 202b may also wish to perform a real-time ownership status check prior to connecting with the network device 202a.

Thus, once the previously described information artifacts, e.g., one or more of the OEM public certificate, the ownership voucher, the nonce, the pinned-domain certificate, the ownership certificate on a network device, the serial number of a network device, etc., has been received, the admin 204 may reach out to the MASA server 206 to verify or validate the real-time ownership status 216 of the network devices 202a, 202b. Minimal information for checking the real-time ownership status 216 may include, for example, the serial number of the network devices 202a, 202b and the pinned-domain certificate of the network devices 202a, 202b. The MASA server 206 may in turn check the issuance based on the serial number of the network devices 202a, 202b and the pinned-domain certificate of the network devices 202a, 202b based on information stored in the ownership database 208 and/or the manufacturing database 210. The MASA server 206 may share the real-time ownership status 216 of the claimed ownership of the network devices 202a, 202b with the admin 204 and/or with the network devices 202a, 202b. The network devices 202a, 202b may then verify the real-time ownership with each other prior to connecting. The real-time ownership of the network devices 202a, 202b may be to determine "Do I really own this network device" or "Does someone else whom I trust own this particular network device," e.g., during or prior to a connection establishment between the network devices 202a, 202b. As previously noted, minimal information for checking the real-time ownership status 216 of the network devices 202a, 202b is as follows:
Yang Model:
yang-data ownership-status-check:
  Ownership-status-check
  Serial-Number Binary
  Pinned-domain-cert Binary The OEM public certificate may help in identifying the OEM MASA server 206 to be reached for the ownership check, e.g., the OEM public certificate may identify the manufacturer of the network devices 202a, 202b. Additionally, the ownership check may be through the MASA cloud service 212 that communicates with the appropriate MASA server 206. The pinned-domain certificate and the ownership certificate may help in identifying the true owner of the network devices 202a, 202b. Additionally, the SUDI or the LdevID based signature with the nonce may help the network devices 202a, 202b protect against replay attacks and freshness of the information provided to be cross verified with the MASA server 206. In configurations, the real-time ownership check of the network devices 202a, 202b may be based on different information artifacts. For example, the real-time ownership status 216 of the network devices 202a, 202b may be based on the OEM public certificates and the ownership vouchers 214a, 214b. The network devices 202a, 202b may verify the real-time ownership with each other prior to connecting based on the OEM certificates and/or the ownership vouchers 214a, 214b.

Figure 3:
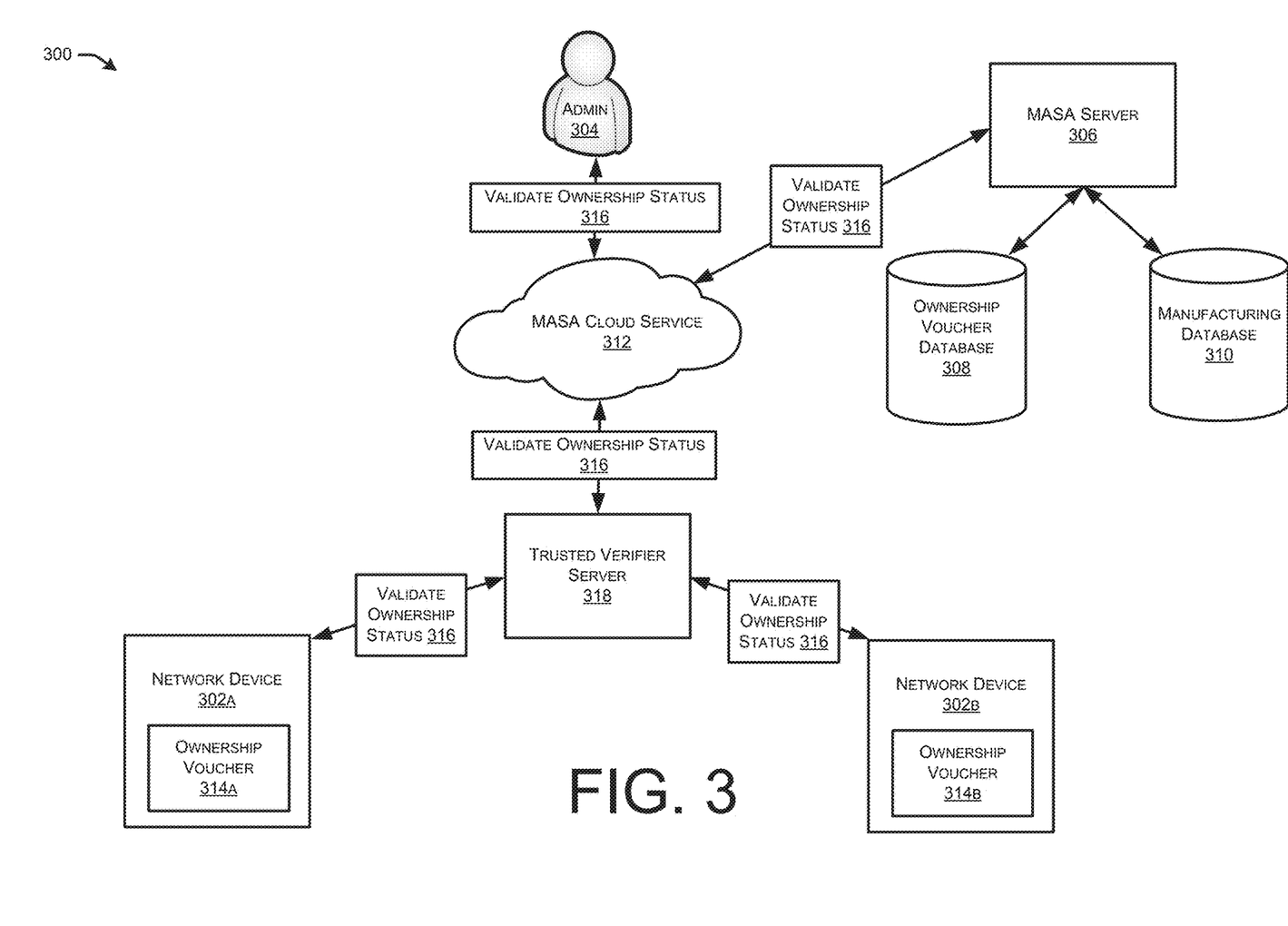
FIG. 3 schematically illustrates another example of a portion of a network in which real-time ownership of network devices may be determined, in accordance with the techniques and architecture described herein.

FIG. 3 schematically illustrates another example arrangement 300 that includes two network device 302a and 302b and an admin 304, e.g., owner, of one or both network devices 302a, 302b. An OEM MASA server 306 that is in communication with an ownership voucher database 308 and a manufacturing database 310 (OEM database) is also included. The example arrangement of FIG. 3 also includes a trusted verifier server (node) 318. In configurations, the trusted verifier server 318 may communicate with the OEM MASA server 306 via a MASA cloud service 312. In some configurations, the trusted verifier server 318 may communicate with the OEM MASA server 306 via a different means.

As is known, an ownership voucher 314a, 314b is anchored on the network devices 302a, 302b, respectively, through, or associated with, a unique device identifier and trust anchor certificates, e.g., a secure unique device identifier (SUDI) certificate or a LdevID certificate, which are anchored on the network devices 302a, 302b as read only, e.g., the certificate cannot be modified. For example, the unique device identifier information is burned onto the network devices 302a, 302b during manufacture of the network devices 302a, 302b. An owner certificate (not shown) for each network device 302a, 302b is anchored on the ownership voucher 314a, 314b, respectively. The MASA's ownership voucher databases 308 and/or manufacturing database 310 associated with the manufacturer of the network device 302a, 302b stores all unique identifiers for the network devices the manufacturer manufactures. In configurations, some of the unique identifiers for the network devices the manufacturer manufactures may be stored in the ownership voucher database 308 and other unique identifiers for the network devices the manufacturer manufactures may be stored in the manufacturing database 310. The admin 304 can take ownership via a MASA workflow of the respective OEM. The OEM can produce the ownership vouchers 314a, 314b after verifying the authenticity of the admin 304. In particular, the MASA server 306 may create the ownership vouchers 314a, 314b at the time of manufacture of the network devices 302a, 302b.

In configurations, a real-time ownership status check may be performed on one (as previously described) or both network devices 302a, 302b, e.g., the admin 304 may wish to determine the real-time ownership status of both the network device 302a and the network device 302b with which the network device 302a wishes to connect. Additionally, the network device 302a may initiate the real-time ownership check while the network device 302b may also wish to perform a real-time ownership status check prior to connecting with the network device 302a.

Thus, once the previously described information artifacts, e.g., one or more of the OEM public certificate, the ownership voucher, the nonce, the pinned-domain certificate, the ownership certificate on a network device, the serial number of a network device, etc., has been received, the trusted verifier server 318 may reach out to the MASA server 306 to verify or validate the real-time ownership status 316 of the network devices 302a, 302b. Minimal information for checking the real-time ownership status 316 may include, for example, the serial number of the network devices 302a, 302b and the pinned-domain certificate of the network devices 302a, 302b. The MASA server 306 may in turn check the issuance based on the serial number of the network devices 302a, 302b and the pinned-domain certificate of the network devices 302a, 302b based on information stored in the ownership database 308 and/or the manufacturing database 310. The MASA server 306 may share the real-time ownership status 316 of the claimed ownership of the network devices 302a, 302b with the trusted verifier server 318.

In configurations, the trusted verifier server 318 may create a time stamped ownership information certificate that indicates the real-time ownership status 316 of the ownership claim for the corresponding network devices 302a, 302b, as well as information that includes original equipment public certificates, pinned-domain certificates and the serial number of the network devices. The stamped ownership information certificate may be signed using the trusted verifier server certificate to provide a signed, stamped ownership information certificate. This signed, stamped ownership information certificate may then be communicated to the network device 302a and the network device 302b for real-time validation of the claimed ownership before allowing any connection between the two network devices 302a, 302b. In configurations, the stamped ownership information certificate may be stored by the trusted verifier server 318. The stamped ownership information certificate may be valid for a pre-determined amount of time and thus, each time a connection is desired between two network devices 302a, 302b (or each time a network device 302a, 302b boots up), the trusted verifier server 318 may utilize the corresponding time stamped ownership information certificates for the corresponding network devices 302a, 302b, if still valid, for verifying the real-time ownership of the network devices 302a, 302b. Accordingly, the MASA server 306 does not need to be contacted every time a real-time ownership check is desired.

Examples of stamped ownership information for checking the real-time ownership status 316 of the network devices 302a, 302b is as follows:
Yang Model:
yang-data stamped-ownership-status
   Stamped-Ownership-Status
   Ownership-Status String
   Original-mfg-cert Binary
   Ownership-Voucher Binary
   Nonce Binary
   Timestamp yang: date-and-time
   Signature PKCS7

Thus, an example of stamped ownership information for checking the real-time ownership status 316 of network devices by the trusted verifier server 318 may include ownership status, OEM manufacturer certificate, pinned-domain certificate, serial number of the network device, a nonce, and a timestamp. Another example of stamped ownership information for checking the real-time ownership status of network devices by the trusted verifier server 318 may include ownership status, OEM manufacturer certificate, ownership voucher, a nonce, and a timestamp. All of the information may be signed using the trusted verifier certificate.

Figure 4:
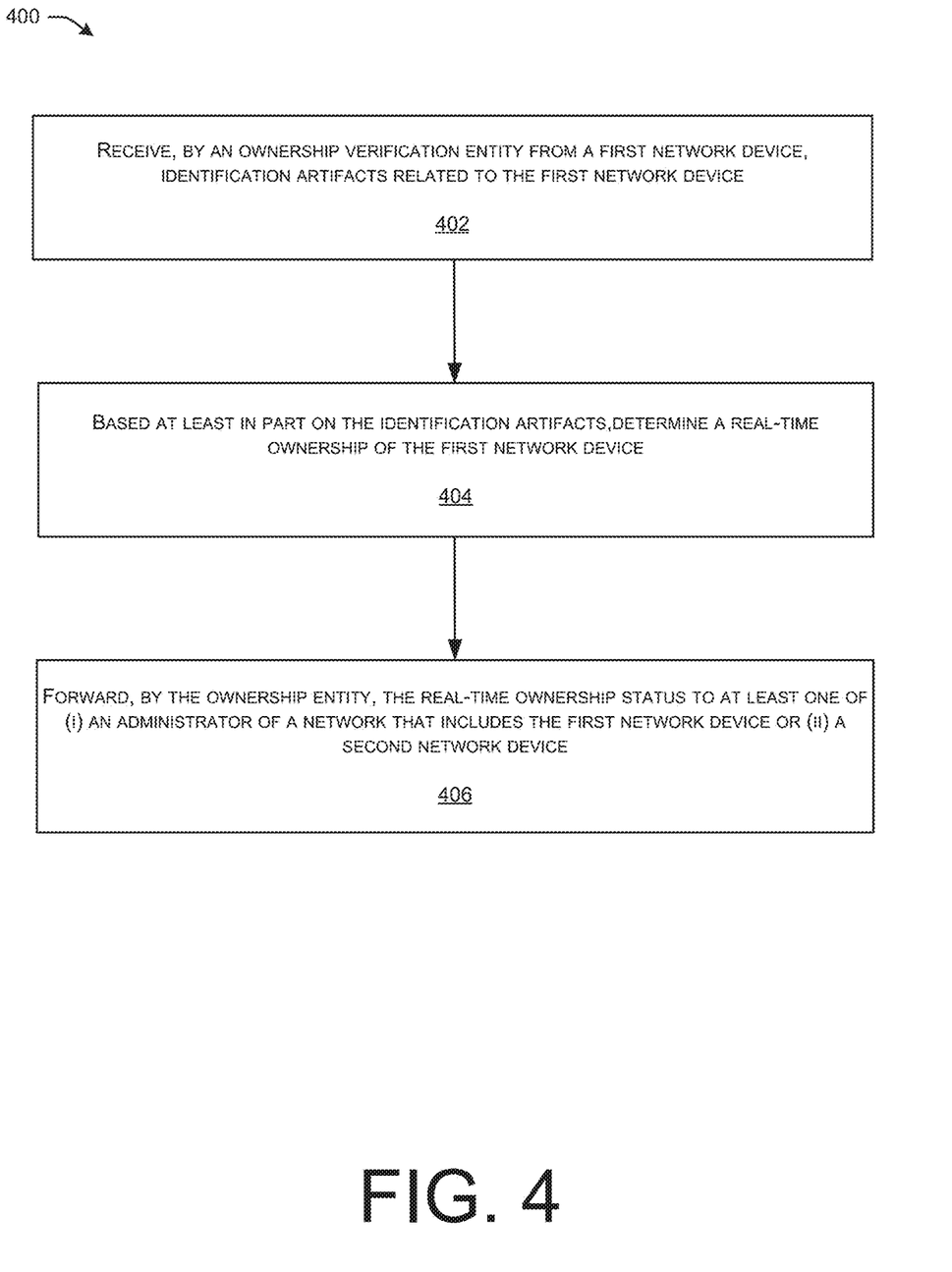
FIG. 4 illustrates a flow diagram of an example method for verifying real-time ownership of network devices, in accordance with the techniques and architecture described herein.

FIG. 4 illustrates a flow diagram of an example method 400 and illustrates aspects of the functions performed at least partly by devices of a network as described with respect to FIGS. 1-3. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for verifying real-time ownership of network devices, e.g., network devices 102, 202a, 202b, 302a, and 302b. In some examples, the method 400 may be performed by a system comprising one or more processors and one or more non-transitory computer-readable media storing computer-executable instructions that, when executed by the one or more processors, cause the one or more processors to perform the method 400.

At 402, an ownership verification entity receives, from a first network device, identification artifacts related to the first network device. For example, information artifacts, e.g., one or more of the OEM public certificate, the ownership voucher, the nonce, the pinned-domain certificate, the ownership certificate on a network device, the serial number of a network device, etc., may be received by one of the admins 104, 204, one or more of the network devices 102, 202a, 202b, 302a, and 302b, and/or the trusted verifier server 318, which may reach out to the MASA server 106, 206, 306 to check the real-time ownership status of one or more of the network devices. Minimal information for checking the real-time ownership status may include, for example, a serial number of a network device and a pinned-domain certificate of the network device.

At 404, based at least in part on the identification artifacts, a real-time ownership status of the first network device is determined. For example, the MASA server 106 may in turn check the issuance of the ownership voucher based on the serial number of the network device and the pinned-domain certificate of the network device based on information stored in the ownership database 108 and/or the manufacturing database 110

At 406, the ownership verification entity forwards the real-time ownership status to at least one of (i) an administrator of a network that includes the first network device or (ii) a second network device. For example, The MASA server 106 may share the real-time status of the claimed ownership of the network device 102 with one of the admins 104, 204, one or more of the network devices 102, 202*a*, 202*b*, 302*a*, and 302*b*, and/or the trusted verifier server 318. The real-time ownership of a network device may be to determine "Do I really own this network device" or "Does someone else whom I trust own this particular network device." e.g., during or prior to a connection establishment with a network device.

Thus, the techniques and architecture described herein provide for checking real-time ownership of network devices. Advantages of checking ownership in real-time with an OEM MASA include, but are not limited to, real-time authenticity of the ownership voucher may be guaranteed. Additionally, the ownership voucher can be revoked via an admin in the network using the OEM MASA, so freshness can be guaranteed in the case of an infinite valid ownership voucher being issued. Furthermore, a real-time check with the OEM database may be performed to check the ownership claim and the sale information. Also, ownership status may be checked with the OEM MASA. Additionally, the techniques and architecture described herein may help in finding whether an entity really owns the network device, or does someone else whom I trust own this particular device. The techniques and architecture described herein may also allow for cross verification of ownership with a respective MASA service in cases where network devices are manufactured by different manufacturers. The techniques and architecture described herein may also allow for enforcing connection only if real time ownership is validated and/or restricting connection for network devices that is owned by specific owners that cannot be trusted. The techniques and architecture described herein can also be extended to various other use cases, including routing. AAA, protocol, critical infrastructure protocols etc. The techniques and architecture described herein may also allow for helping operational simplicity and automation using the MASA workflows and helping in easy deployment without manual intervention and help with real time validation.

Figure 5:
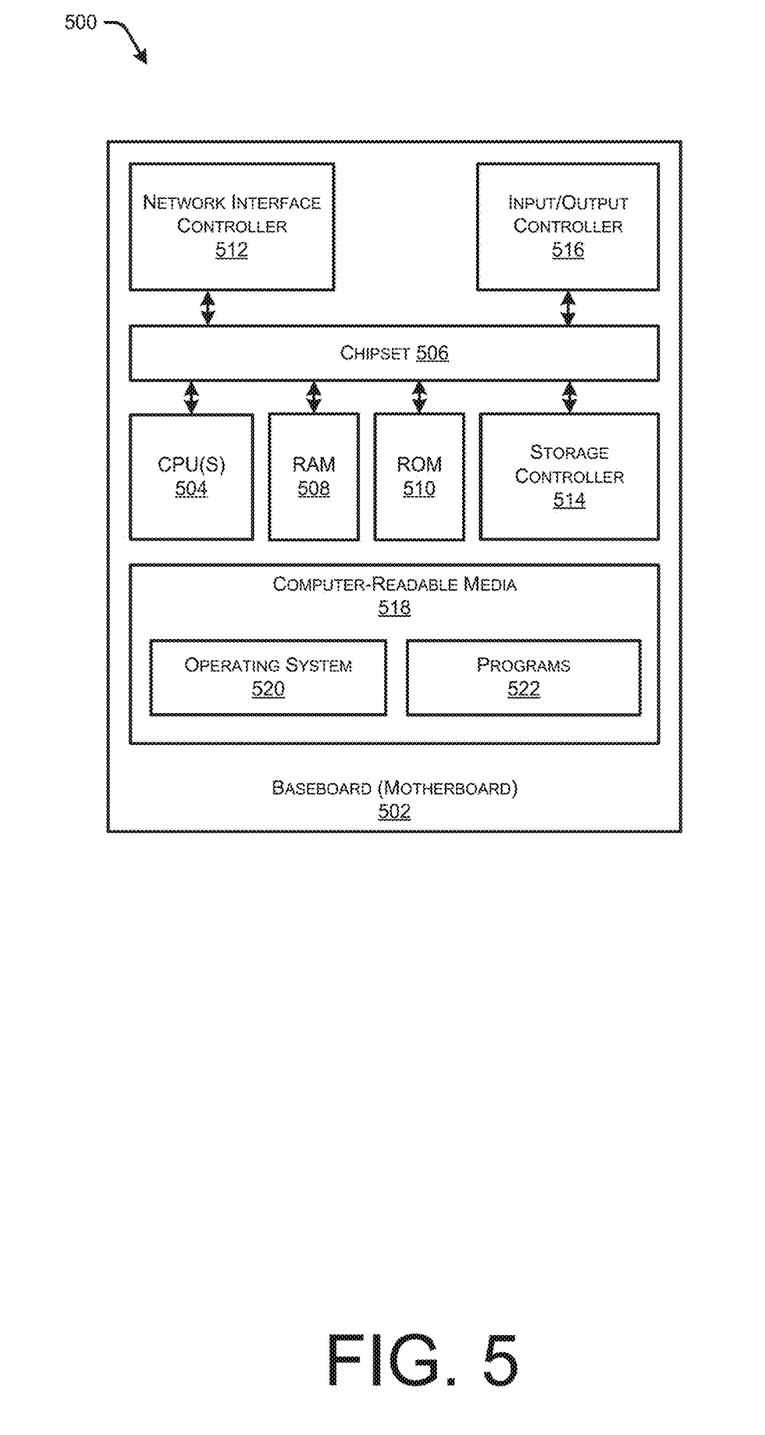
FIG. 5 is a computer architecture diagram showing an example computer hardware architecture for implementing a device that can be utilized to implement aspects of the various technologies presented herein.

FIG. 5 shows an example computer architecture for a computing device 500 capable of executing program components for implementing the functionality described above. In configurations, one or more of the computing devices 500 may be used to implement one or more of the components of FIGS. 1-4. The computer architecture shown in FIG. 5 illustrates a conventional server computer, router, switch, workstation, desktop computer, laptop, tablet, network appliance, e-reader, smartphone, or other computing device, and can be utilized to execute any of the software components presented herein. The computing device 500 may, in some examples, correspond to a physical device or resources described herein.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network, such as the example arrangements 100, 200, and 300. The chipset 506 can include functionality for providing network connectivity through a NIC 512, such as a gigabit Ethernet adapter. In configurations, the NIC 512 can be a smart NIC (based on data processing units (DPUs)) that can be plugged into data center servers to provide networking capability. The NIC 512 is capable of connecting the computing device 500 to other computing devices over networks. It should be appreciated that multiple NICs 512 can be present in the computing device 500, connecting the computer to other types of networks and remote computer systems.

The computing device 500 can include a storage device 518 that provides non-volatile storage for the computer. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the cloud network, and or any components included therein, may be supported by one or more devices similar to computing device 500. Stated otherwise, some or all of the operations described herein may be performed by one or more computing devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1-4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

The computing device 500 may support a virtualization layer, such as one or more virtual resources executing on the computing device 500. In some examples, the virtualization layer may be supported by a hypervisor that provides one or more virtual machines running on the computing device 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

upon initiation of a connection establishment between a first network device and a second network device, receiving, by a manufacturer authorized signing authority from the first network device, identification artifacts related to the first network device, wherein the identification artifacts comprise an ownership voucher, an original equipment manufacturer (OEM) public certificate, an ownership voucher signed by the OEM public certificate, a pinned-domain certificate, and a nonce, wherein the identification artifacts are signed by a unique device identifier;

based at least in part on the identification artifacts, determining a real-time ownership status of the first network device;

forwarding, by the manufacturer authorized signing authority, the real-time ownership status to at least one of (i) a verifier server, (ii) an administrator of a network that includes the first network device, or (iii) a second network device;

creating by the verifier server, a signed stamped ownership information certificate comprising one or more of (i) ownership status, (ii) the OEM certificate, (iii) the nonce, (iv) a timestamp, (v) the pinned-domain certificate, (vi) a serial number, or (vii) the ownership voucher, wherein the signed stamped ownership information certificate is signed with a signature of the verifier server;

forwarding the signed stamped ownership information certificate to the first network device and the second network device;

based on the signed stamped ownership information certificate, verifying, by the second network device, real-time ownership of the first network device; and
based on the real-time ownership status being verified and valid, establishing a connection between the first network device and the second network device.

2. The method of claim 1, further comprising:
based at least in part on the OEM public certificate, determining an identity of the manufacturer authorized signing authority.

3. The method of claim 1, wherein:
determining the real-time ownership status of the first network device comprises based on the serial number and the pinned-domain certificate, verifying, by the manufacturer authorized signing authority, an ownership voucher issuance by the manufacturer authorized signing authority for the first network device.

4. The method of claim 3, further comprising:
based at least in part on the OEM public certificate, determining an identity of the manufacturer authorized signing authority.

5. The method of claim 1, wherein determining the real-time ownership status of the first network device comprises:
forwarding, by the verifier server to the manufacturer authorized signing authority, an ownership voucher; and
based on the ownership voucher, verifying, by the manufacturer authorized signing authority, an ownership voucher issuance by the manufacturer authorized signing authority for the first network device.

6. The method of claim 5, further comprising:
based at least in part on the OEM public certificate, determining an identity of the manufacturer authorized signing authority.

7. The method of claim 1, wherein determining the real-time ownership status of the first network device comprises:
forwarding, by the verifier server to the manufacturer authorized signing authority, the serial number and the pinned-domain certificate; and
based on the serial number and the pinned-domain certificate, verifying, by the manufacturer authorized signing authority, an ownership voucher issuance by the manufacturer authorized signing authority for the first network device.

8. The method of claim 7, further comprising:
based at least in part on the OEM public certificate, determining an identity of the manufacturer authorized signing authority.

9. A system comprising:
one or more processors; and
one or more non-transitory computer-readable media storing computer-executable instructions that, when executed by the one or more processors, cause the one or more processors to perform actions comprising:
upon initiation of a connection establishment between a first network device and a second network device, receiving, by a manufacturer authorized signing authority from the first network device, identification artifacts related to the first network device, wherein the identification artifacts comprise an ownership voucher, an original equipment manufacturer (OEM) public certificate, an ownership voucher signed by the OEM public certificate, a pinned-domain certificate, and a nonce, wherein the identification artifacts are signed by a unique device identifier;
based at least in part on the identification artifacts, determining a real-time ownership status of the first network device;
forwarding, by the manufacturer authorized signing authority, the real-time ownership status to at least one of (i) a verifier server, (ii) an administrator of a network that includes the first network device, or (iii) a second network device;
creating by the verifier server, a signed stamped ownership information certificate comprising one or more of (i) ownership status, (ii) the OEM certificate, (iii) the nonce, (iv) a timestamp, (v) the pinned-domain certificate, (vi) a serial number, or (vii) the ownership voucher, wherein the signed stamped ownership information certificate is signed with a signature of the verifier server;
forwarding the signed stamped ownership information certificate to the first network device and the second network device;
based on the signed stamped ownership information certificate, verifying, by the second network device, real-time ownership of the first network device; and
based on the real-time ownership status being verified and valid, establishing a connection between the first network device and the second network device.

10. The system of claim 9, wherein the actions further comprise:
based at least in part on the OEM public certificate, determining an identity of the manufacturer authorized signing authority.

11. The system of claim 9, wherein:
determining the real-time ownership status of the first network device comprises based on the serial number and the pinned-domain certificate, verifying, by the manufacturer authorized signing authority, an ownership voucher issuance by the manufacturer authorized signing authority for the first network device.

12. The system of claim 11, wherein the actions further comprise:
based at least in part on the OEM public certificate, determining an identity of the manufacturer authorized signing authority.

13. The system of claim 9, wherein determining the real-time ownership status of the first network device comprises:
forwarding, by the verifier server to the manufacturer authorized signing authority, an ownership voucher; and
based on the ownership voucher, verifying, by the manufacturer authorized signing authority, an ownership voucher issuance by the manufacturer authorized signing authority for the first network device.

14. The system of claim 13, wherein the actions further comprise:
based at least in part on the OEM public certificate, determining an identity of the manufacturer authorized signing authority.

15. The system of claim 9, wherein determining the real-time ownership status of the first network device comprises:
forwarding, by the verifier server to the manufacturer authorized signing authority, the serial number and the pinned-domain certificate; and
based on the serial number and the pinned-domain certificate, verifying, by the manufacturer authorized signing authority, an ownership voucher issuance by the manufacturer authorized signing authority for the first network device.

16. The system of claim 15, further comprising:
based at least in part on the OEM public certificate, determining an identity of the manufacturer authorized signing authority.

17. One or more non-transitory computer-readable media storing computer-executable instructions that, when executed by one or more processors, cause the one or more processors to perform actions comprising:
upon initiation of a connection establishment between a first network device and a second network device, receiving, by a manufacturer authorized signing authority from the first network device, identification artifacts related to the first network device, wherein the identification artifacts comprise an ownership voucher, an original equipment manufacturer (OEM) public certificate, an ownership voucher signed by the OEM public certificate, a pinned-domain certificate, and a nonce, wherein the identification artifacts are signed by a unique device identifier;
based at least in part on the identification artifacts, determining a real-time ownership status of the first network device;
forwarding, by the manufacturer authorized signing authority, the real-time ownership status to at least one of (i) a verifier server, (ii) an administrator of a network that includes the first network device, or (iii) a second network device;
creating by the verifier server, a signed stamped ownership information certificate comprising one or more of (i) ownership status, (ii) the OEM certificate, (iii) the nonce, (iv) a timestamp, (v) the pinned-domain certificate, (vi) a serial number, or (vii) the ownership voucher, wherein the signed stamped ownership information certificate is signed with a signature of the verifier server;
forwarding the signed stamped ownership information certificate to the first network device and the second network device;
based on the signed stamped ownership information certificate, verifying, by the second network device, real-time ownership of the first network device; and
based on the real-time ownership status being verified and valid, establishing a connection between the first network device and the second network device.

18. The one or more non-transitory computer-readable media of claim 17, wherein:
determining the real-time ownership status of the first network device comprises based on the serial number and the pinned-domain certificate, verifying, by the manufacturer authorized signing authority, an ownership voucher issuance by the manufacturer authorized signing authority for the first network device.

19. The one or more non-transitory computer-readable media of claim 17, wherein determining the real-time ownership status of the first network device comprises:
forwarding, by the verifier server to the manufacturer authorized signing authority, an ownership voucher; and
based on the ownership voucher, verifying, by the manufacturer authorized signing authority, an ownership voucher issuance by the manufacturer authorized signing authority for the first network device.

20. The one or more non-transitory computer-readable media of claim 17, wherein determining the real-time ownership status of the first network device comprises:
forwarding, by the verifier server to the manufacturer authorized signing authority, the serial number and the pinned-domain certificate; and
based on the serial number and the pinned-domain certificate, verifying, by the manufacturer authorized signing authority, an ownership voucher issuance by the manufacturer authorized signing authority for the first network device.

* * * * *